(12) United States Patent
Boccacci

(10) Patent No.: US 6,938,823 B2
(45) Date of Patent: Sep. 6, 2005

(54) PORTABLE APPARATUS FOR SCIENTIFIC IDENTIFICATION OF AN INDIVIDUAL

(75) Inventor: Roberto Boccacci, Rome (IT)

(73) Assignee: Italdata Ingegneria Dell'Idea S.p.A., Rome (IT)

( * ) Notice: Subject to any disclaimer, the term of this patent is extended or adjusted under 35 U.S.C. 154(b) by 139 days.

(21) Appl. No.: 10/239,404

(22) PCT Filed: Mar. 13, 2001

(86) PCT No.: PCT/IT01/00127

§ 371 (c)(1),
(2), (4) Date: Sep. 23, 2002

(87) PCT Pub. No.: WO01/71670

PCT Pub. Date: Sep. 27, 2001

(65) Prior Publication Data

US 2003/0075598 A1 Apr. 24, 2003

(30) Foreign Application Priority Data

Mar. 22, 2000 (IT) .................... RM2000A00151

(51) Int. Cl.⁷ .............................................. G06K 7/08
(52) U.S. Cl. ..................................................... 235/451
(58) Field of Search ............................... 235/451, 453; 464/160–167, 102–112

(56) References Cited

U.S. PATENT DOCUMENTS

| | | | | |
|---|---|---|---|---|
| 3,959,987 A | * | 6/1976 | Garey ......................... | 464/155 |
| 5,668,570 A | * | 9/1997 | Ditzik ........................ | 345/173 |
| 5,799,912 A | * | 9/1998 | Ponzio et al. ............... | 248/121 |
| 5,812,368 A | * | 9/1998 | Chen et al. ................. | 361/681 |
| 6,036,287 A | | 3/2000 | Kim | |
| 6,262,885 B1 | * | 7/2001 | Emma et al. ............... | 361/683 |
| 6,320,974 B1 | * | 11/2001 | Glaze et al. ................ | 382/115 |
| 6,443,543 B1 | * | 9/2002 | Chiang ..................... | 312/223.3 |
| 6,522,763 B2 | * | 2/2003 | Burleson et al. ............ | 381/189 |
| 6,628,814 B1 | * | 9/2003 | Shapiro ...................... | 382/127 |
| 6,717,816 B1 | * | 4/2004 | Tanaka et al. .............. | 361/728 |
| 2002/0050523 A1 | * | 5/2002 | Veligdan ................ | 235/462.07 |

FOREIGN PATENT DOCUMENTS

| | | |
|---|---|---|
| EP | 0 371 642 A | 6/1990 |
| EP | 1 077 399 A | 2/2001 |
| HU | 217494 B | 4/1991 |
| WO | 94/22371 A | 10/1994 |
| WO | 98/45769 A | 10/1998 |
| WO | 99/16025 A | 4/1999 |

OTHER PUBLICATIONS

Patent Abstracts of Japan, vol. 1998, No. 10, Aug. 31, 1998 & JP 10–133773 A, May 22, 1998, abstract and US 6,166, 722 A, Mitsubishi Denki Kabushiki Kaisha, Dec. 26, 2000.
Patent Abstracts of Japan, vol. 2000, No. 05, Sep. 14, 2000, and JP 2000 048177 A, Fujitsu Takamisawa Component Ltd.), Feb. 18, 2000.

* cited by examiner

*Primary Examiner*—Thien M. Le
*Assistant Examiner*—Edwyn Labaze
(74) *Attorney, Agent, or Firm*—Nixon & Vanderhye P.C.

(57) ABSTRACT

A portable apparatus for scientific identification of an individual comprises, in a container (1) in the form of a small suitcase, a computer which is compatible with operating systems intended to use programs for scientific identification. The computer is connected to a monitor (2) and to a keyboard (3); it is able to be connected to a printer which is external to the container, and is predisposed for remote connection to a processing center responsible for identification. The apparatus further comprises a fingerprint reader (4) connected to the computer, and a digital camera (5) connected to the computer.

10 Claims, 3 Drawing Sheets

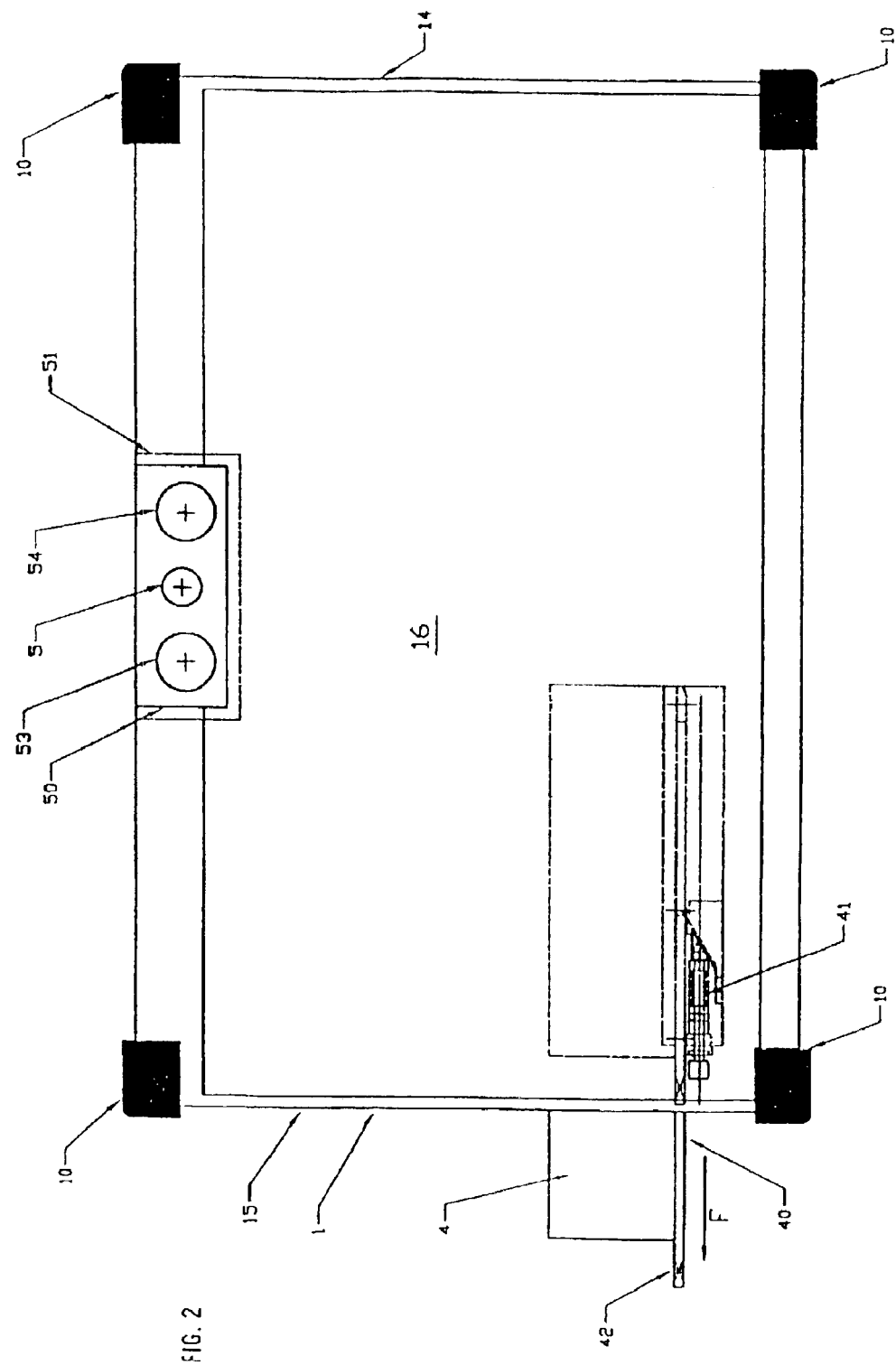

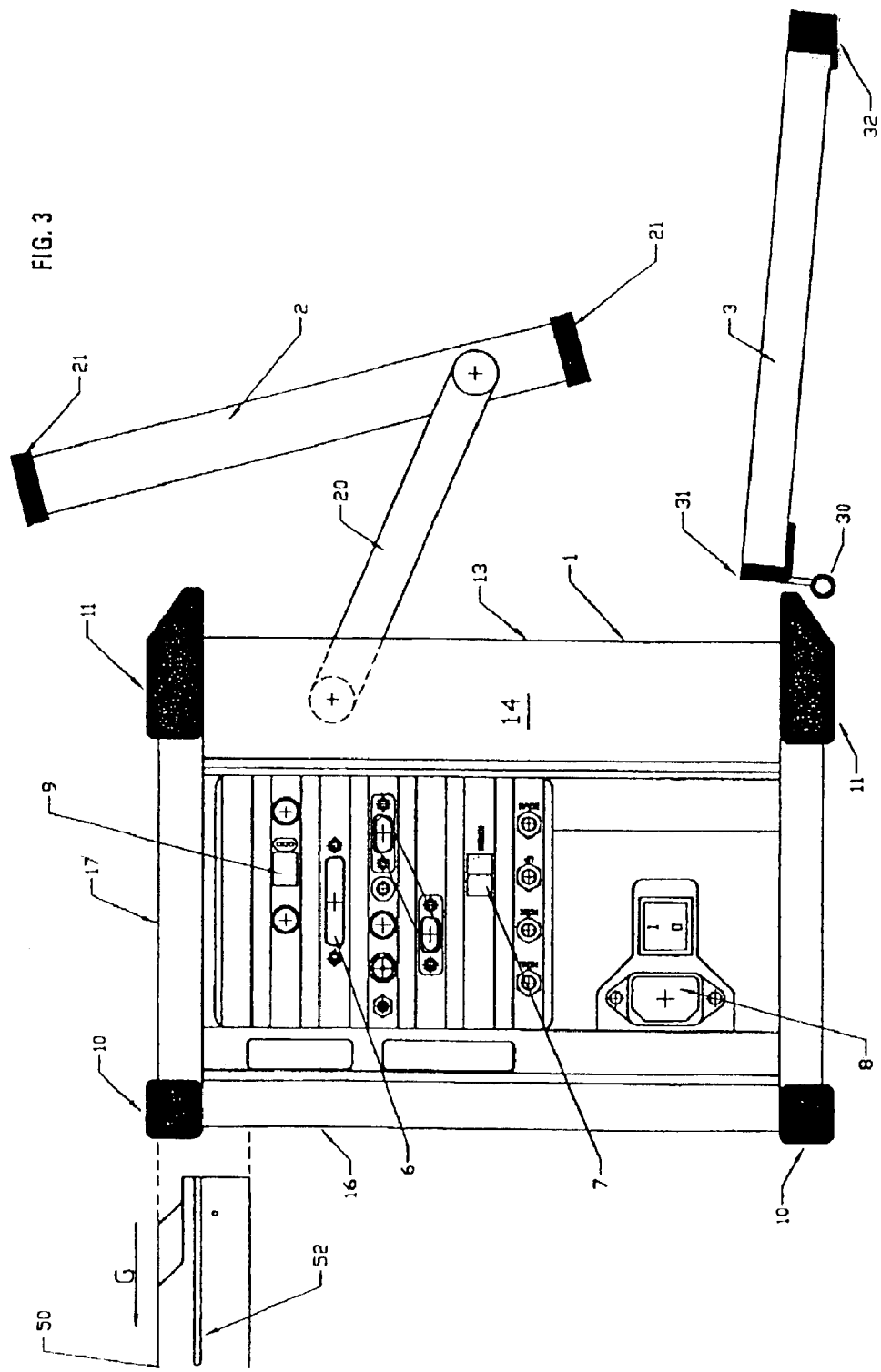

PORTABLE APPARATUS FOR SCIENTIFIC IDENTIFICATION OF AN INDIVIDUAL

BACKGROUND OF THE INVENTION

The present invention concerns a portable apparatus for scientific identification of an individual.

As is known, establishing identity is a matter of great legal importance. For example, in the area of criminal law, ascertaining the identity of a corpse or identifying an accused are essential elements in a process for arriving at the truth. Thus, incontrovertibly ascertaining the identity of a prisoner also allows justice to pursue its course.

In other more common aspects in everyday life, ascertaining personal identity becomes a matter of considerable relevance; consideration may be given to the phenomenon of illegal immigration, or the fairly common event of people who are stopped for judicial investigations and enquiries and who are not in a position to prove their own identity.

In the case of living persons, the current procedures provide scientific identification which more specifically involves the implementation of an identification card on which are noted descriptive, photographic, fingerprint and anthropological data of the person to be identified. In the majority of cases, even if this operation is limited to transcription of the stated generalities, the steps of applying the index fingers which have been previously pressed against an inked pad, and applying the identification photograph of the person being identified, and the compilation of the card, or the card-indexing procedure, generally take up a period of time of not less than 60 minutes on the part of the police organisation with responsibility for this. Added to that time is the period required to travel from the place where the person was stopped, to arrive at the 'card-indexing' point, generally a provincial office of the administrative organisation in question, and the time necessary for sending the card to an office, generally a regional office, at which processing of the data takes place. Here in particular, a fingerprint expert carries out the identification procedure. In that case, that is to say when the card-indexing operation is not effected directly at the regional office, the overall time for identification may even amount to two weeks, due to the further known delay in transmission. It is apparent that such an overall period of time can exceed the maximum period of detention for establishing identity, as is permitted by law, thus totally nullifying the effects involved.

In addition, with the current procedures and with the available equipment, it is impossible for identification of a person to be implemented at a place different from the above-indicated offices, that is to say at the station at which a person is actually detained or at an adjacent station, such as for example in a reception camp, in a mobile office, or in a railway or airport police detention centre.

In addition the actual operation of examining the fingerprints, which is carried out by experts by virtue of comparing those taken from the identification card and those on record by a procedure of scanning the cards which have been previously recorded involves a high level of error and a considerable amount of time.

The procedure also involves an operation for cleaning up the image of the fingerprint after scanning of the card document, before insertion in the database.

SUMMARY OF THE INVENTION

Therefore it is an object of the present invention to permit personal identification at any location.

Another object of the invention is that of reducing as compared with the times for generating an identification WO 99 16025 A (RAYTHEON CO) relates to a stand-alone workstation to be used in connection with a biometric identification system. The workstation comprises a portable computer, a biometric data input system, and a portable communications terminal coupled to said portable computer. Said input biometric data comprises input fingerprint data and photographic data, which are obtained through a fingerprint scanner and a camera respectively. It should be understood that the cited document provides only general suggestions for a portable integrated apparatus but does not teach on a concrete structural solution. card, or card-indexing, as compared with the times required at present.

A further object of the invention is that of reducing the times required for storage of the data detected on the identification card in appropriate databases.

Still a further object of the invention is that of eliminating the operation for cleaning up the image of the fingerprint before incorporation thereof in the database.

It is a further object of the invention to reduce the probability of error in terms of comparison of the identification data detected with those stored in said databases.

A still further object is that of making the personal identification procedure adaptable to the various procedures adopted by various organisations in different countries.

In accordance with the present invention there is provided a portable apparatus for scientific identification of an individual, characterised by comprising, in a container in the form of a small suitcase:

a computer which is compatible with the operating systems intended to use programs for scientific identification is connected to a monitor, to a keyboard and to a printer external to the container, and is equipped with means for remote connection to a processing centre responsible for identification, a fingerprint reader connected to the computer, and a digital camera connected to the computer.

BRIEF DESCRIPTION OF THE DRAWINGS

The present invention will now be described, merely by way of example, with reference to a preferred embodiment thereof, and with reference to the Figures of the accompanying drawings in which:

FIG. 2 is a front view of the apparatus of FIG. 1, and FIG. 3 is a side view of the apparatus of FIG. 1.

DESCRIPTION OF PREFERRED EMBODIMENTS

Figure 1:
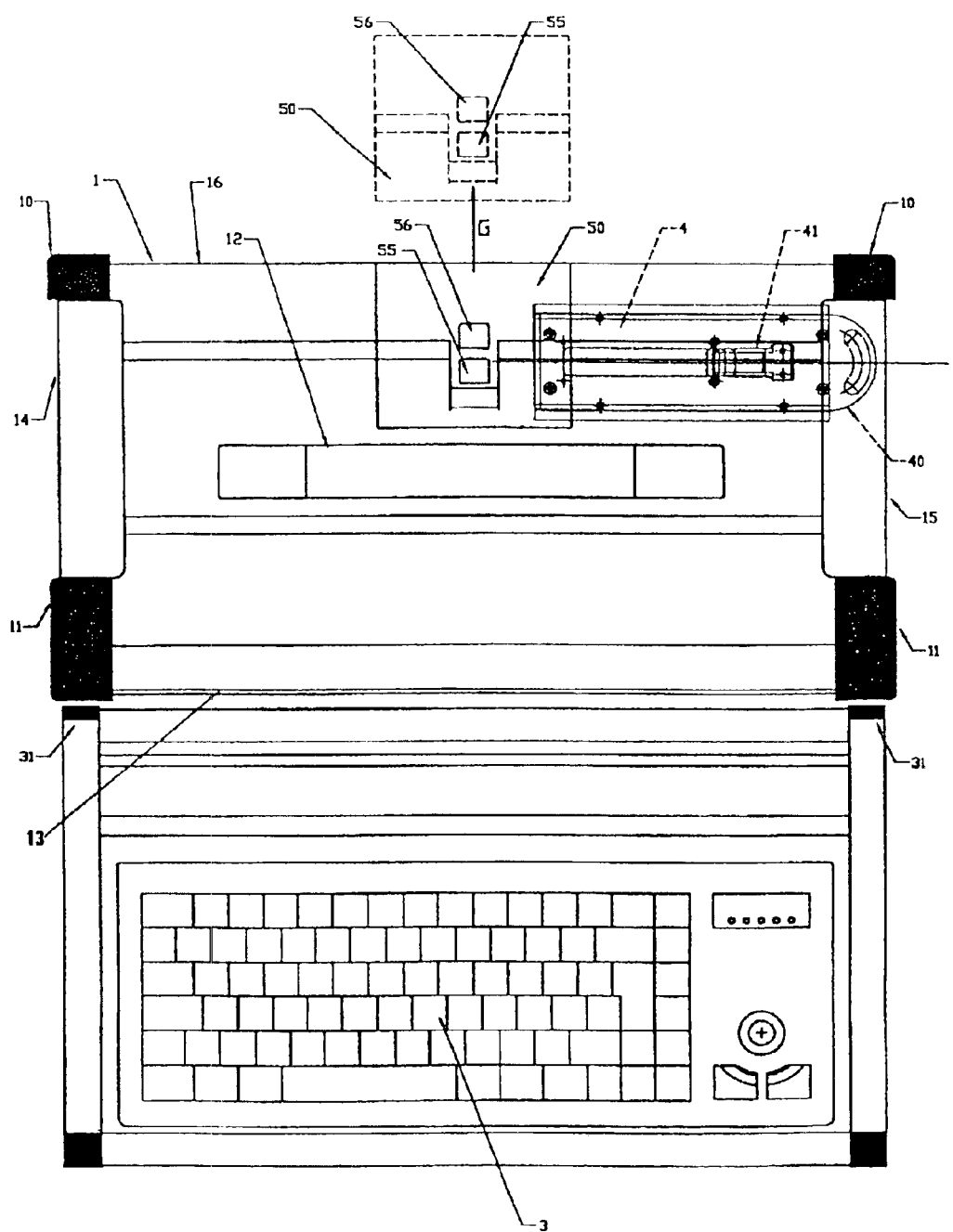
FIG. 1 is a plan view of the portable apparatus for scientific identification according to the invention.

It will be appreciated that various alternative configurations may be used without thereby departing from the scope of protection of the present invention.

Referring to the Figures the apparatus according to the invention has the external appearance of a container 1 in the form of a small suitcase. Preferably it is of a parallelepipedic shape and is made of a rigid, generally metallic material, for example comprising shaped members 17 of aluminium alloy in order to achieve characteristics of lightness, strength and resistance to external agents and forces. The container 1, preferably at the tips of its corners, has damping elements, generally as indicated at 10, 11, which act as shock-absorbers. As shown in FIG. 1 the container 1 also has a handle 12 as a gripping element for transporting it.

Accommodated in its interior the container has a computer and the container is of such a structure as to contain removably therein a monitor or video display 2, a keyboard 3, a fingerprint reader 4 and a digital camera 5 (in this case a miniaturised digital camera), all those components being connected to the computer with associated interface cards.

With reference to FIGS. 1 and 3, in which the container 1 is shown in the open position, a side face thereof which is indicated by reference 13 can be closed by the keyboard 3 which acts as a cover. The keyboard 3 has at least one pair of handles (one thereof is shown in FIG. 3 and indicated by reference numeral 30) which also serve as legs for inclined positioning of the keyboard. Shock-absorber elements 31, 32 are provided at the corners of the keyboard 3. Even if it is clearly necessary for operation of the installation, the keyboard connecting cable is not shown in the Figures.

Referring now to FIG. 3, the monitor 2 is supported orientably by means of two opposite side arms which are indicated by reference numeral 20 and which are pivotably mounted to the walls 14 and 15 of the container 1. In the closed position (not shown) the monitor 2 is in a vertical position in a seat parallel to the keyboard 3, when applied as a cover to the face 13 of the container 1. The monitor 2 is also provided with shock-absorber elements as indicated generally at 21.

As shown in FIGS. 1 and 2 the fingerprint reader 4 is mounted on a slide 40 in the form of a plate, which is movable transversely to project from the face 15 of the container as indicated by the arrow F. The reader 4 is removably connected to the slide 40 by a locking mechanism as indicated at 41 but which will not be further described herein, which may be of any suitable type for the operation which it is to perform. At its outward end, at least on one side, the slide 40 has an arcuate recess 42 to make it easier to use the finger to entrain the sliding movement of the slide 40.

In a side face 16 of the container, which is remote from that of the cover keyboard 3, the camera 5 (FIG. 2) is mounted in a body 50 removably received in a housing recess 51 disposed at a position corresponding to a corner of the container 1. For this purpose the body 50 of the camera 5 and the housing recess 51 are provided with a prismatic retaining coupling diagrammatically indicated at 52 in FIG. 3. The camera 5 is self-lighting by virtue of light sources mounted in the body 50 thereof. The light sources which are diagrammatically indicated at 53 and 54 are two lamps provided with parabolic reflectors and intended to be used in the case of shooting with a low level of light. Provided in the upper part of the body 50 are actuating push buttons 55 and 56 (FIG. 1) of the camera 5. The body 50 of the camera 5 is normally connected to the computer by a connector. When it has been extracted from the housing 51 in the container 1 in the manner indicated by the arrow G (FIG. 3) the body 50 with the camera 5 remains connected thereto by means of a cable (not shown).

Diagrammatically shown in FIG. 3 in the side face 14 of the container 1 are the connector port 6 for connection to a printer which is external to the container 1 (the printer is not shown), a connecting socket 7 for a telephone line, a power supply connection 8 with a switch, and a connection 9 to a local network, besides other connectors for connection of the keyboard 3 and the monitor 2.

In that way the apparatus according to the invention is predisposed for connection to the printer and for remote connection to a centre responsible for identification.

When the apparatus is in the rest position it is completely closed; the side face 13 is closed by the keyboard and the side faces 14 and 15 respectively of the connectors and output for the reader 4 are closed by panels (not shown). The keys of the keyboard 3 then face the screen of the monitor 2.

In the position of use the keyboard 3 is brought out by rotating it outwardly through 90° whereupon the keys are uppermost. The monitor 2 is then displaced from the interior of the keyboard and oriented in the manner shown in FIG. 3. The monitor and the keyboard are normally connected to the computer by means of their cables (not shown).

The apparatus is ready for the card-indexing operation.

On the keyboard 3 the operator keys in the specified general data for the person being identified, as well as all the other descriptive and anthropological data required in the areas envisaged by the application and visible on the monitor 2. That person's fingerprints are acquired by way of the reader 4, by setting the fingers down gently for a very short period of time, while the camera 5 is used to frame the upper part of the body of the person being identified and captures the electronic image thereof when judged appropriate.

At that moment, a total of a few minutes having passed, the card-indexing procedure is complete; all the data necessary for identification will have been acquired and the apparatus will automatically proceed to implement remote connection to the processing centre for downloading the acquired data. Immediately thereafter, with connection to a printer (not shown), the apparatus is capable of furnishing the data on a physical support such as a cardboard card or a card of plastics material or 'badge'. The data will be applied to the identification card in the conventional ways with encoding and thus protection from forgery.

The advantages of the apparatus, which will be apparent from the foregoing, include primarily the saving in time, effectiveness in use and reliability, as well as the adaptability to the most widely varying demands of the areas in everyday life, in various countries, with the simple substitution of the operating systems involved. In summary, its characteristics permit a substantial improvement in the current typical identification procedures.

What is claimed is:

1. A portable apparatus for scientific identification of an individual, comprising in a container in the form of a small suitcase, a computer compatible with operating systems intended to use programs for scientific identification and connected to a monitor and a keyboard and, the computer being connectable to a printer external to the container, said computer being equipped with means for remote connection to a processing centre responsible for identification, a fingerprint reader connected to the computer, and a digital camera connected to the computer, wherein:
   the fingerprint reader is mounted on a slide slidable in such a way as to project from a face of the container for use and to return to the interior of the container when not in use, and
   the digital camera is removably received in a housing recess provided in a corner of the container, the digital camera and the housing recess being provided with a prismatic retaining coupling.

2. Apparatus according to claim 1, wherein the monitor is supported on each of two opposite sides thereof by at least one pivotably mounted arm for displacement between a rest position in which it is internal to the container and parallel to a face thereof and an orientable position of use in which it is external to the container.

3. Apparatus according to claim 2, wherein, in the rest position, the keyboard is capable of constituting a side face of the container, while in the working position it is separated from the container.

4. Apparatus according to claim 2, wherein, in the rest position, the keyboard is disposed in a reversed condition with the keys facing towards the monitor in such a way that it is already in the operative position at the moment of use.

5. Apparatus according to claim 1, wherein the container is made of rigid material and has at least the tips of its corner covered with shock absorbers of rubber.

6. The apparatus according to claim 5, wherein at least one of the keyboard and the monitor includes at least one shock absorber positioned adjacent the container shock absorbers in the rest position.

7. The apparatus according to claim 6, wherein both the keyboard and the monitor include shock absorbers positioned adjacent the container shock absorbers in the rest position.

8. The apparatus according to claim 1, further comprising a handle provided to the keyboard, the handle projecting from the container in the rest position, the handle being constructed to function as a support leg when the keyboard is in the operative position.

9. The apparatus according to claim 1, wherein the fingerprint reader slide is positioned so as to extend from a lower portion of a side wall of the container.

10. The apparatus according to claim 9, wherein the camera is positioned on a rear wall of the container.

* * * * *